Figure 1:
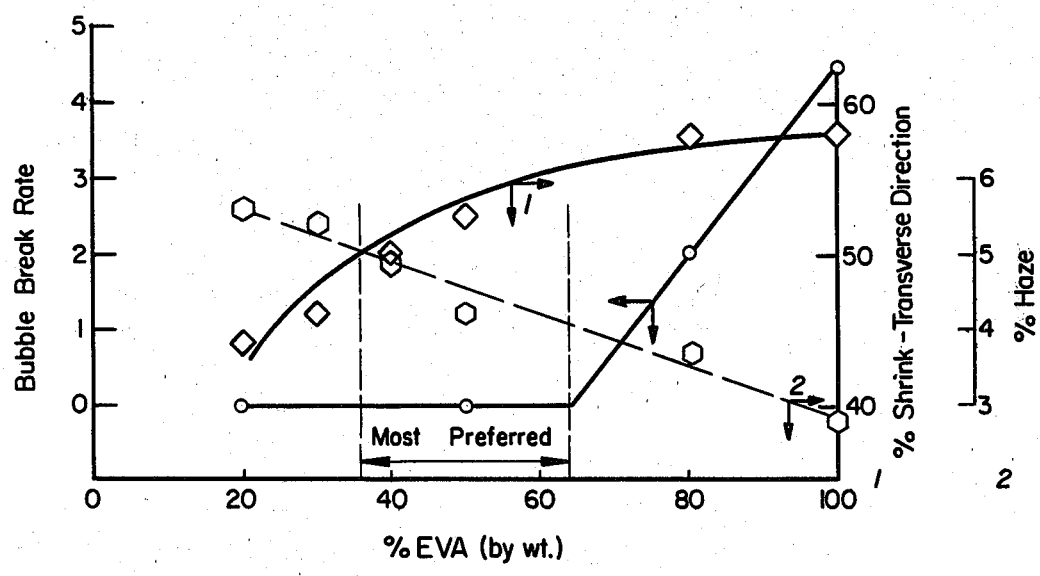

United States Patent [19]

Nattinger et al.

[11] 4,357,376
[45] Nov. 2, 1982

[54] MULTILAYER FILM FOR PRIMAL MEAT PACKAGING

[75] Inventors: Bruce E. Nattinger, Oak Park; Stephen J. Vicik, Darien, both of Ill.

[73] Assignee: Union Carbide Corporation, Danbury, Conn.

[21] Appl. No.: 278,851

[22] Filed: Jul. 6, 1981

[51] Int. Cl.³ .................... B65D 25/06; B32B 27/08
[52] U.S. Cl. .................... 428/35; 428/216; 428/516; 428/518; 428/520; 428/910; 426/264; 426/105; 426/127
[58] Field of Search .............. 428/35, 216, 516, 518, 428/520

[56] References Cited

U.S. PATENT DOCUMENTS

| | | | |
|---|---|---|---|
| 3,817,821 | 6/1974 | Gallini | 428/516 |
| 3,821,182 | 6/1974 | Baird, Jr. et al. | 260/91.7 |
| 4,031,162 | 6/1977 | Bray et al. | 525/108 |
| 4,048,428 | 9/1977 | Baird, Jr. et al. | 526/343 |
| 4,112,181 | 9/1978 | Baird, Jr. et al. | 428/336 |
| 4,207,363 | 6/1980 | Lustig et al. | 428/518 |
| 4,247,584 | 1/1981 | Widiger et al. | 428/35 |

FOREIGN PATENT DOCUMENTS 53-3037784 4/1978 Japan .................... 428/520

*Primary Examiner*—P. Ives
*Attorney, Agent, or Firm*—Real J. Grandmaison; John C. Lefever; Harrie M. Humphreys

[57] ABSTRACT

A heat-shrinkable multilayer film suitable for use in the packaging of primal meat cuts wherein the first outer layer comprises a blend of ethylene-vinyl acetate copolymer, propylene-ethylene copolymer, and 1-butene-ethylene copolymer; a core layer comprising a vinylidene chloride-vinyl chloride copolymer; and a second outer layer comprising an ethylene-vinyl acetate copolymer.

15 Claims, 1 Drawing Figure

MULTILAYER FILM FOR PRIMAL MEAT PACKAGING

This invention relates to a heat-shrinkable multilayer film, and more particularly, to a heat-shrinkable multilayer film suitable for use in the packaging of a primal meat cut. In addition, the invention relates to a bag fabricated from the multilayer film.

Generally, a primal meat cut is a large cut of meat smaller than a side of beef but larger than a typical retail cut sold to a consumer. A primal meat cut is prepared at the slaughter house and then shipped to a retail store or institution such as a restaurant at which the primal meat cut is butchered into smaller cuts of meat.

It is the customary practice to package a primal meat cut for shipment so that oxygen from the air is prevented from contacting the meat. This minimizes spoilage and discoloration of the meat.

It is known from the prior art for packaging meat cuts to use a film including a layer serving as an oxygen barrier to protect the meat from spoilage, such as a layer of polyvinylidene chloride copolymer. The other layers generally provide strength, abrasion resistance, and good low temperature properties.

Other important properties of suitable films include puncture resistance, heat shrink properties of from about 30% to about 50% at about 90° C. for both the machine and transverse directions, and resistance to delamination at elevated temperatures and during the heat shrinking.

Preferably, the film suitable for primal meat cuts should be capable of being heat sealable so that a bag can be fabricated from the film and the heat sealed seams should resist being pulled apart during the heat shrinking.

In addition to having desirable chemical and physical properties, the multilayer film must also be economical to manufacture and be suitable for commercial production. Typically, the process of manufacturing this type of heat shrinkable film is a tubular stretching process wherein a primary tube of the film is biaxially stretched with internal pressure in the transverse direction and by stretching in the machine direction through the use of paired nip rollers running at different speeds. The multilayer film should provide a minimum of bubble breaks during production, and lend itself to production stretching processes.

Preferably, the multilayer film is usually either extruded through a mutual die or the film components are coated one upon another to form a tube which is quenched, reheated, and subsequently expanded at a temperature suitable for producing a biaxial stretching to some or all of the film layers, thus imparting appropriate shrinkage and strength characteristics to the thus produced film. One such technique for the production of such bags is known as the "double bubble" process and is disclosed in U.S. Pat. No. 3,456,044 to Pahlke.

Typical prior art heat-shrinkable multilayer films are described in U.S. Pat. Nos. 3,741,253 and 4,031,162 to Brax et al, and Canadian Patent 982,923 to Lustig et al. The Canadian Pat. No. 982,923 discloses a film comprising a first outer layer which consists essentially of a first ethylene-vinyl acetate copolymer having a melt index of from about 0.1 to about 1.0 decigrams per minute, and a vinyl acetate content of from about 10 to about 14 weight percent, based on the weight of the first ethylene-vinyl acetate copolymer. The core layer consists essentially of a vinylidene chloride copolymer having at least about 65 weight percent of polymerized vinylidene chloride and containing a maximum of about 5 weight percent plasticizer, the percentage being based on the weight of the vinylidene chloride copolymer. A second outer layer of the film comprises a second ethylene-vinyl acetate copolymer having a melt index of from about 0.1 to about 1.0 decigrams per minute and a vinyl acetate content of from about 12 to about 18 weight percent, the percentage being based on the second ethylene-vinyl acetate copolymer.

The aforementioned film may suitably be produced by coextruding the three constituent layers through a tubular die, and then cooling and subsequently biaxially stretching the extrudate at an appropriate temperature to obtain a heat shrinkable film suitable for forming the primal red meat bag. The extrusion and stretching process described in U.S. Pat. No. 3,555,604 issued January, 1971 in the name of H. E. Pahlke may suitably be employed to produce such heat shrinkable film.

The stretched three-layer film, as extruded in the tubular form, is formed into bags by flattening the extruded tube, cutting the flattened tubes into desired lengths and heat sealing the sealable layers at one end while leaving the other end open for insertion of primal cuts of fresh red meat. The heat-sealable layers will then form the inner surface of the bag. After the meat is placed in the bag by the meat packer or other processor, the bag is evacuated and the open end thereof sealed in a convenient manner such as by clipping. The bag is then heat shrunk by exposure to elevated temperature, as for example by passage of the bag through a hot water spray, at a temperature which may suitably be on the order of 90°–95° C.

A further modification of such heat-shrinkable multilayer films is disclosed in U.S. Pat. No. 4,207,363 to Lustig et al. A four-layer film is therein disclosed whereby the first outer layer and core layer are as previously described, and includes a second core layer comprising an extrudable adhesive capable of stretching during the biaxial stretching stage. The four-layer film further includes a second outer layer composed of a blend of propylene-ethylene copolymer, a (1-butene)-ethylene copolymer, and an ethylene-propylene copolymer or ethylene-propylene diene terpolymer thermoplastic elastomer.

As earlier indicated, there are numerous physical property requirements which a primal meat cut bag must meet to perform satisfactorily in the packaging application. In addition to providing the aforementioned oxygen barrier, a suitable bag should possess sufficient shrinkage at usual shrink tunnel temperatures to intimately encase the meat cut and provide a skin-tight, protective package. The bag should possess optical properties adequate to permit optimal viewing of the encased product. Further, the stiffness of the bag should be intermediate, i.e., the bag should not be so stiff that it is cut or fractured when the open end of the bag is clipped shut, nor too limp so that the packager has difficulty opening the bag to insert a meat cut. In addition, the bag should have adequate adhesion between the film plies so that the bag does not delaminate or its layers separate upon storage. Obviously, the bag should also have good abrasion resistance and tensile strength.

Generally, the bags of the prior art are possessed of the aforementioned physical properties, but they are prone to production interruptions in the form of breaks of the stretched bubble. Thus, it is also desirable to improve productivity in preparing the bags by employing a composition having increased toughness during the biaxial stretching process resulting in fewer bubble breaks, while providing a film possessing the requisite physical properties. While generally providing satisfactory results, possessing most of the desired physical properties, and displaying a resistance to stretched bubble breaks, the films taught by Lustig in U.S. Pat. No. 4,207,363 have been found deficient with respect to shrinking properties, optical properties, and film stiffness for optimum use as such. More specifically, these bags for packaging primal meat cuts have poor optical properties as measured by haze and gloss, and also relatively low shrinkage properties at 90° C., and thus will not form an adequate package around oddly-shaped meat cuts especially if lower shrink tunnel temperatures are employed. Additionally, without the aforementioned adhesive layer the film plies have a tendency to delaminate, thereby rendering the bag useless. Finally, since a four-layer film with no identical layers requires an additional extruder and an additional die or die modifications, all of which represent substantial capital investment costs over a similar three-layer product, a three-layer product is preferred.

In view of the foregoing, there is a need for providing multilayer films which overcome the above-noted deficiencies.

Accordingly, it is a principal object of this invention to provide multilayer films which overcome the noted deficiencies in the prior art multilayer films.

It is a further object of this invention to provide multilayer films which enable a substantial increase in the resistance of the composite film to productivity-interrupting bubble breaks during the biaxial stretching process while retaining physical properties suitable for optimal operation in red meat packaging applications.

It is still a further object of this invention to provide multilayer films which are resistant to bubble breaks during biaxial stretching thereof while possessing excellent optical properties and shrinkage characteristics.

These objects, and others, will be apparent from a reading of the following description of the invention and the appended claims.

In accordance with the present invention, there is provided a heat-shrinkable multilayer film suitable for use in packaging a primal meat cut and suitable for fabricating a bag therefrom for use in packaging a primal meat cut wherein the multilayer film includes a first outer layer comprising a blend of ethylene-vinyl acetate copolymer, propylene-ethylene copolymer, and 1-butene-ethylene copolymer; a core layer comprising a vinylidene chloride-vinyl chloride copolymer; and a second outer layer comprising an ethylene-vinyl acetate copolymer. More specifically, the first outer layer may contain from between about twenty percent and about eighty percent by weight of the ethylene-vinyl acetate copolymer, from between about ten percent and about forty percent by weight of the propylene-ethylene copolymer, and from between about ten percent and about forty percent by weight of the 1-butene-ethylene copolymer, all weight percentages being based on the weight of the outer layer. However, it is preferred that the first outer layer contain from between about thirty-eight percent and about sixty-four percent by weight of the ethylene-vinyl acetate copolymer, from between about eighteen percent and about thirty-one percent by weight of the propylene-ethylene copolymer, and from between about eighteen percent and about thirty-one percent by weight of the 1-butene-ethylene copolymer, all weight percentages being based on the weight of the outer layer, because bubble breaks in the biaxial stretching operation are minimized. Optimum results are obtained when the first outer layer contains about fifty percent by weight of the ethylene-vinyl acetate copolymer, about twenty-five percent by weight of the propylene-ethylene copolymer, and about twenty-five percent by weight of the 1-butene-ethylene copolymer, all weight percentages being based on the weight of the outer layer.

In addition, the ethylene-vinyl acetate component of the first outer layer of this invention may contain between about eight percent and about sixteen percent, preferably about twelve percent, by weight of vinyl acetate based on the weight of the ethylene-vinyl acetate copolymer, and has a melt index of between about 0.1 and about 11 decigrams per minute. The propylene-ethylene component of the first outer layer may contain between approximately one percent and about ten percent, preferably between about four percent and about six percent, by weight of ethylene, based on the weight of the propylene-ethylene copolymer, and has a melt flow at 230° C. of between about 2 and about 12 decigrams per minute. The 1-butene-ethylene component of the first outer layer contains between about two percent and about ten percent, preferably between about three percent and about six percent, by weight of ethylene based on the weight of the 1-butene-ethylene copolymer, and has a melt index of between about 0.1 and about 3.0 decigrams per minute, preferably about 1.0 decigrams per minute.

The core layer of the multilayer film of this invention preferably comprises a vinylidene chloride-vinyl chloride copolymer blended with suitable stabilizers, plasticizers, and lubricants to facilitate extrusion. The core component may contain between about sixty-five percent and about ninety percent by weight of polymerized polyvinylidene chloride and between about ten percent and about thirty-five percent by weight of vinyl chloride based on the weight of the copolymer, and provides a satisfactory oxygen barrier for the multilayer film. In addition, as will be immediately obvious to one skilled in the art, other barrier materials may be suitably substituted for the vinylidene chloride-vinyl chloride copolymer without wavering from the scope and substance of the instant invention. Examples of other barrier materials are acrylonitrile copolymers, vinyl alcohol polymers and copolymers, ethylene-vinyl alcohol copolymers, and the like, as well as vinylidene chloride copolymers polymerized with chemicals other than vinyl chloride, such as acrylonitrile, acrylate esters such as methyl methacrylate, and the like.

The second outer layer of the multilayer film of this invention comprises an ethylene-vinyl acetate copolymer containing about twelve percent by weight of vinyl acetate based on the weight of the copolymer and has a melt index of between about 0.1 decigrams and about 1.0 decigrams, preferably about 0.3 decigrams, per minute.

The preferred ratio of thickness in percent by weight of the first outer layer to the core layer to the second outer layer of the multilayer film of this invention is 15 to 15 to 70, respectively. The overall thickness of the multilayer film of this invention should generally be from between about 1.5 mils to about 4.5 mils, and preferably about 2.4 mils, to provide for suitable strength and barrier properties for protecting the encased primal meat cut without producing an unnecessarily thick product.

The first outer layer preferably has a thickness of between about 0.2 mils and about 0.7 mils. The core layer preferably has a thickness of between about 0.2 mils and about 0.7 mils. The second outer layer preferably has a thickness of between about 1.0 mils and about 3.2 mils.

As used herein the term "biaxially stretched" when used to describe a multilayer film or a constituent film layer means that the film or a constituent layer has been subjected to a biaxial stretching in the range from about 12 to about 24. The term "biaxial stretching" as used herein is the product between the draw ratio in the machine direction (MD) and the stretch ratio (blow ratio) in the transverse direction (TD), and is conveniently approximated by the ratio of the stretched to the unstretched area of the film, or constituent layer thereof. For tubular "double bubble" extrusion, the TD stretch ratio (blow ratio) is the flat width of the final film exiting the stretching process divided by the flat width of the primary tube or "stem" entering the stretching process. The MD draw ratio is the speed of the faster stretching exit nip roller divided by the speed of the slower entering nip roller.

The present invention is based on the surprising and unexpected discovery that the aforementioned first outer layer blend composition provides significant improvements in the biaxial stretching process without deteriorating physical properties requisite for use of the multilayer film for red meat packaging. One of the main advantages of the present invention is a significant increase in film resistance to bubble breaks which interrupt the biaxial stretching process and result in significant process waste, while maintaining adequate physical properties for optimal use of the resulting film for fresh red meat packaging applications. Obviously, the first outer layer blend composition can be used as a single layer film or as a component layer or layers in a multiple-ply film structure. However, in its preferred application, it is used as one layer of a three-layer heat-shrinkable barrier film used primarily for red meat packaging.

In addition, to be suitable for red meat packaging the film employed should have a film haze below about five percent of forward scattered light for optimal viewing of the packaged product. Further, the shrinkage of the film at usual shrink tunnel temperatures, i.e., about 90° C., should be greater than about 50 percent in the film transverse direction so that a skin-tight protective package is properly formed.

In accordance with this invention, the foregoing desirable physical properties for a red meat packaging are obtained as will more clearly be evident from the following examples. Thus, illustrative, non-limiting examples of the features and practice of the invention are set out below. The parts and percentages set forth herein refer to parts by weight and percentages by weight, respectively, unless specifically stated otherwise.

In the following examples, the sample multilayer films were formed by co-extrusion of the film layers through a tubular die, with the film being biaxially stretched in accordance with the conventional "double bubble" film-forming process. Such process is described for example in U.S. Pat. No. 3,555,604 issued January, 1971 in the name of H. E. Pahlke. Further, the melt index and melt flow values, respectively, of the polymers described herein were determined in accordance with ASTM test method D-1238, Condition E and Condition L, respectively.

The polymers shown below in Table 1 and the compositions shown in Table 2 were used in the examples.

TABLE 1

| Film Layer | Thickness Percent | Material | Description of Material |
|---|---|---|---|
| Second Outer | 70 | Ethylene-vinyl acetate copolymer | 0.3 m.i., 12% vinyl acetate |
| Core | 15 | Vinylidene chloride-vinyl chloride copolymer | Blended with suitable stabilizers, plasticizers and lubricants to make extrusion advantageous |
| First Outer | 15 | Blend comprising: Ethylene-vinyl acetate copolymer | 0.3 m.i., 12% vinyl acetate |
|  |  | Propylene-ethylene copolymer | 5.0 m.f., 3-4% ethylene |
|  |  | 1-butene-ethylene copolymer | 1.0 m.i., 3-6% ethylene |

TABLE 2

| | Weight Percentages of Blend Components | | |
|---|---|---|---|
| Example | $EVA_1$ | P-E Copolymer$_2$ | 1-B-E Copolymer$_3$ |
| 1 | 20 | 40 | 40 |
| 2 | 30 | 35 | 35 |
| 3 | 40 | 30 | 30 |
| 4 | 50 | 25 | 25 |
| 5 | 80 | 10 | 10 |
| 6 | 100 | 0 | 0 |

Note that Example 6 is outside the scope of the instant invention, and is included as a control example. Subscript 1 represents ethylene-vinyl acetate copolymer containing about 12 percent by weight of vinyl acetate and having a melt index of about 0.3, available from E. I. DuPont de Nemours and Co. as Elvax 3135. Subscript 2 represents propylene-ethylene copolymer containing about 3 to 4 percent by weight of ethylene and having a melt flow of about 5.0 decigrams per minute, available from Soltex Polymer Corp. as 42X01. Subscript 3 represents 1-butene-ethylene copolymer containing about 3 to 6 percent by weight of ethylene and having a melt index of about 1.0, available from Shell Chemical Co. as polybutylene 1600 A.

Table 2 depicts proportions of ethylene-vinyl acetate copolymer suitable in the blend composition for the first outer layer film of this invention and that the amount of propylene-ethylene copolymer and 1-butene-ethylene copolymer each may vary from 40 percent to 10 percent by weight of the blend composition. Also, the propylene ethylene copolymer and 1-butene-ethylene copolymer may be present in equal amounts, as in the preferred form, although this is not requisite. These proportions may be seen from FIG. 1, which plots bubble break rate, machine direction shrinkage, and percent film haze versus percent EVA in the invention blend of biaxially stretched, three layer film structures listed in Tables 1 and 2. These examples are produced in the conventional manner by extrusion through separate extruders, into a single die where the three melts are joined and formed into a tube which after leaving the die is cooled and subsequently reheated and stretched in a biaxial manner, using the process of Pahlke disclosed in U.S. Pat. No. 3,555,064.

By referring to FIG. 1 it is seen that the addition of propylene-ethylene copolymer and 1-butene-ethylene copolymer to the first outer layer composition containing ethylene-vinyl acetate copolymer results in a reduction in bubble breaks during the biaxial stretching operation. From FIG. 1, it is also seen that when the total amount of ethylene-vinyl acetate copolymer reaches about 64 percent by weight and that of the propylene-ethylene copolymer and that of the 1-butene-ethylene copolymer each reach about 18 percent by weight, that bubble breaks are eliminated. The advantageous reduction in bubble breaks occurs throughout the ranges of between about 20 to 64 weight percent of ethylene-vinyl acetate copolymer, and from about 40 to about 18 weight percent each of the propylene-ethylene copolymer and the 1-butene-ethylene copolymer. Again referring to FIG. 1, it is seen that the film haze is below about 5 percent of forward scattered light as measured by ASTM test method D1003, and that the shrinkage of the film at a shrink tunnel temperature of about 90° C. is greater than about 50 percent in the film transverse direction when the ethylene-vinyl acetate copolymer content of the first outer layer blend is greater than about 38 weight percent, and the contents of the propylene-ethylene copolymer and the 1-butene-ethylene-copolymer are equal and each less than about 31 weight percent of the blend.

It has also been found when employing the ethylene-vinyl acetate copolymer, propylene-ethylene copolymer, and 1-butene-ethylene copolymer blend as a first outer layer of a multilayer film that the optical properties of the resultant film will vary with the percent of vinyl acetate present in the ethylene-vinyl acetate copolymer. That is, the film haze is at a minimum and the film gloss is at a maximum when the amount of vinyl acetate in the ethylene-vinyl acetate copolymer is about 12 percent by weight. Above and below that level, film haze increases and film gloss decreases. Although it is preferred that film haze remain below about 8 percent and film gloss above about 75 percent for optimal viewing of the packaged product, values of 10 percent film haze and 70 percent gloss are generally acceptable. Therefore, the weight percent of vinyl acetate in the ethylene-vinyl acetate copolymer should preferably remain between about 8 and about 16 percent by weight of the copolymer to provide the preferred optical properties, although acceptable optical properties are obtained throughout the 6 to 18 percent range.

By comparison, the improved shrinkage properties resultant from this invention are nearly invariant throughout the entire aforementioned range of vinyl acetate content. However, when the melt index of the ethylene-vinyl acetate copolymer is very high, the shrinkage improvement is lost. More specifically, a first outer layer film blend composition containing an ethylene-vinyl acetate copolymer having a vinyl acetate content of 28 percent by weight and a melt index of about 6.0 decigrams per minute provides a shrinkage percentage of about 37 at about 90° C. in the machine direction and about 46 percent in the transverse direction. A film blend composition containing an ethylene-vinyl acetate copolymer having a vinyl acetate content of 28 percent by weight and a melt index of about 15 decigrams per minute provides a shrinkage percentage of only about 29 at about 90° C. in the machine direction and about 38 percent in the transverse direction. It was found that at a melt index of approximately 11, the improvement in shrinkage essentially disappears.

Although preferred embodiments of this invention have been described in detail, it is contemplated that modifications thereof may be made and some preferred features may be employed without others, within the spirit and scope of the broad invention.

What is claimed is:

1. A flexible heat-shrinkable multilayer film suitable for packaging a primal red meat cut, said multilayer film including a first outer layer comprising a blend of ethylene-vinyl acetate copolymer, propylene-ethylene copolymer, and 1-butene-ethylene copolymer; a core layer comprising a vinylidene chloride-vinyl chloride copolymer; and a second outer layer comprising an ethylene-vinyl acetate copolymer; said first outer layer containing from between about twenty percent and about eighty percent by weight of said ethylene-vinyl acetate copolymer, from between about ten percent and about forty percent by weight of said propylene-ethylene copolymer, and from between about ten percent and about forty percent by weight of said 1-butene-ethylene copolymer, all weight percentages based on the weight of said first outer layer.

2. A multilayer film as in claim 1 wherein said first outer layer contains about fifty percent by weight of said ethylene-vinyl acetate copolymer, about twenty-five percent by weight of said propylene-ethylene copolymer and about twenty-five percent by weight of said 1-butene-ethylene copolymer, all weight percentages based on the weight of said outer layer.

3. A multilayer film as in claim 1 wherein said ethylene-vinyl acetate copolymer of said first outer layer contains between about eight percent and about sixteen percent by weight of vinyl acetate based on the weight of said ethylene-vinyl acetate copolymer.

4. A multilayer film as in claim 3 wherein said ethylene-vinyl acetate copolymer has a melt index of between about 0.1 and 11.0 decigrams per minute.

5. A multilayer film as in claim 1 wherein said propylene-ethylene copolymer contains between about one percent and about ten percent by weight of ethylene based on the weight of said propylene-ethylene copolymer.

6. A multilayer film as in claim 5 wherein said propylene-ethylene copolymer has a melt flow at 230° C. of between about 2 and about 12 decigrams per minute.

7. A multilayer film as in claim 1 wherein said 1-butene-ethylene copolymer contains between about two percent and about ten percent by weight of ethylene based on the weight of said 1-butene-ethylene copolymer.

8. A multilayer film as in claim 7 wherein said 1-butene-ethylene copolymer has a melt index of between about 0.1 and about 3.0 decigrams per minute.

9. A multilayer film as in claim 1 wherein said vinylidene chloride-vinyl chloride copolymer contains between about sixty-five percent and about ninety percent by weight of polymerized polyvinylidene chloride and between about ten percent and about thirty-five percent by weight of vinyl chloride based on the weight of said vinylidene chloride-vinyl chloride copolymer.

10. A multilayer film as in claim 1 wherein said second outer layer comprises an ethylene-vinyl acetate copolymer containing about twelve percent by weight of vinyl acetate based on the weight of said copolymer.

11. A multilayer film as in claim 10 wherein said ethylene-vinyl acetate copolymer has a melt index of between about 0.1 decigrams and about 1.0 decigrams per minute.

12. A primal meat bag formed from the multilayer film of claim 1.

13. A multilayer film as in claim 1 wherein said first outer layer has a thickness of between about 0.2 mils and about 0.7 mils, said core layer has a thickness of between about 0.2 mils and about 0.7 mils, and said second outer layer has a thickness of between about 1.0 mil and about 3.2 mils.

14. A primal meat bag formed from the multilayer film of claim 13.

15. A primal meat bag formed from the multilayer film of claim 14.

* * * * *

UNITED STATES PATENT AND TRADEMARK OFFICE
CERTIFICATE OF CORRECTION

PATENT NO. : 4,357,376
DATED : November 2, 1982
INVENTOR(S) : Bruce E. Nattinger and Stephen J. Vicik It is certified that error appears in the above—identified patent and that said Letters Patent is hereby corrected as shown below:

Column 10, lines 5-6, for "A primal meat bag formed from the multilayer film of claim 14" read--A multilayer film as in claim 1 wherein said first outer layer contains from between about thirty-eight percent and about sixty-four percent by weight of said ethylene-vinyl acetate copolymer, from between about eighteen percent and about thirty-one percent by weight of said propylene-ethylene copolymer and from between about eighteen percent and about thirty-one percent by weight of said 1-butene-ethylene copolymer, all weight percentages based on the weight of said outer layer--.

Signed and Sealed this

Twenty-ninth Day of March 1983

[SEAL]

Attest:

GERALD J. MOSSINGHOFF

Attesting Officer        Commissioner of Patents and Trademarks